Figure 1:
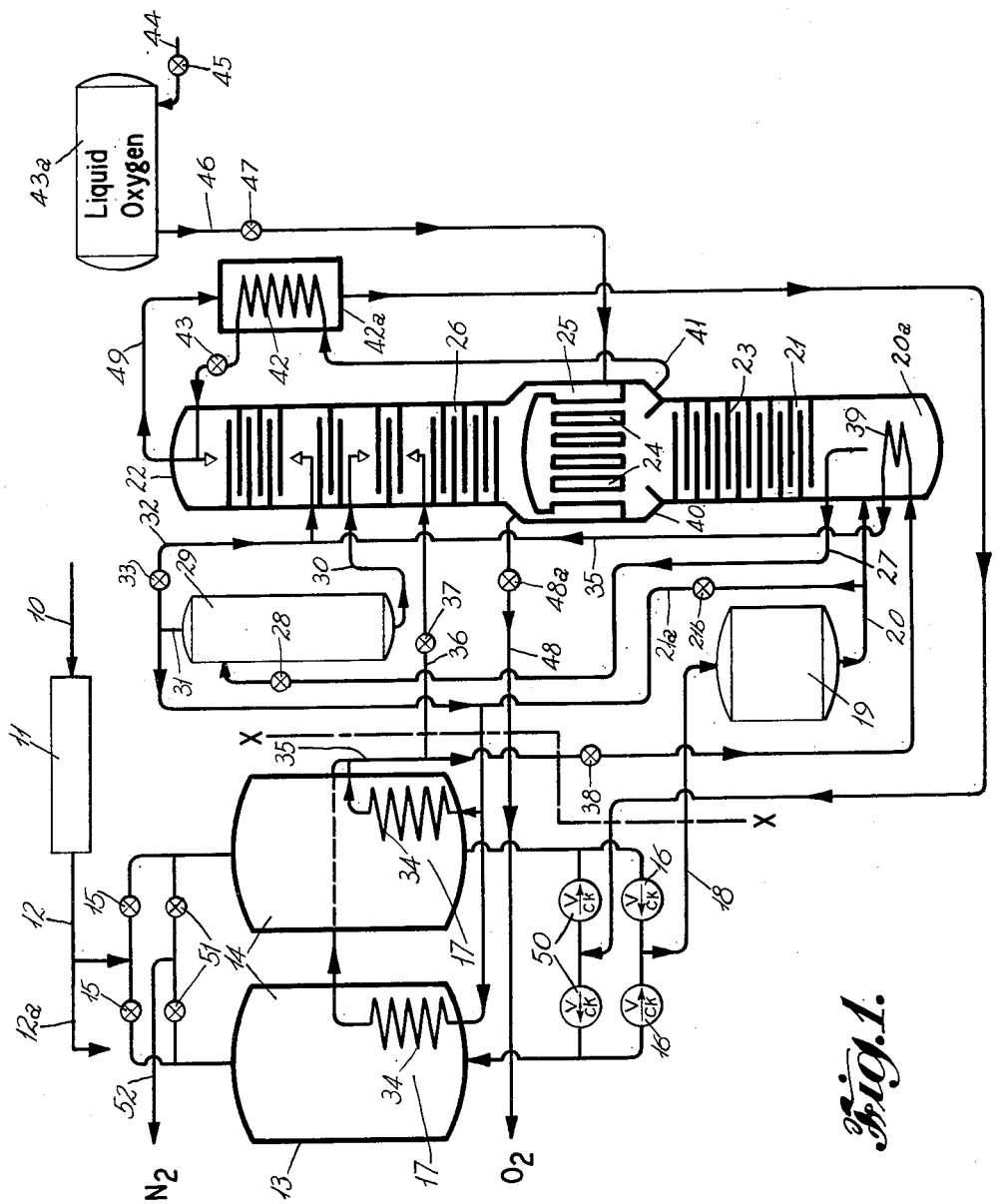

INVENTORS
LADISLAS C. MATSCH
BY William F. Mesinger
ATTORNEY

3,039,274
PROCESS AND APPARATUS FOR PURIFYING AND SEPARATING COMPRESSED GAS MIXTURES
Ladislas C. Matsch, Kenmore, N.Y., assignor to Union Carbide Corporation, a corporation of New York
Filed Mar. 28, 1958, Ser. No. 724,722
18 Claims. (Cl. 62—24)

This invention relates to an improved process of and apparatus for purifying and separating compressed gas mixtures, and more particularly to improved process and apparatus for the separation of carbon dioxide and other low-boiling impurities from compressed air prior to low-temperature rectification of such air into air components.

Atmospheric air contains substantial quantities of carbon dioxide and other low-boiling impurities, and unless these impurities are removed by chemical treatment of the air, or by adsorption therefrom, they will deposit as solid particles on the air side heat exchange surfaces as the air is cooled. This causes considerable difficulty, because if such deposition is continued the air side heat exchange surfaces become coated with thick layers of solid particles thus reducing heat transfer efficiency. Eventually these surfaces will plug up completely, making the air separation process inoperative. One solution to this problem is to utilize duplicate heat exchangers piped in parallel so that a clogged heat exchanger may be thawed while the other is in use. However, such duplication is an expensive solution because thawing incurs losses of refrigeration in operation and the heat exchangers represent a major item of air separation plant investment cost.

In air separation plants employing relatively low air supply pressures, e.g. below about 150 p.s.i.g., most of the low-boiling impurities are removed from the incoming air and deposited in the colder section or part of a reversible heat exchange zone by heat exchange with the outgoing air separation products. This zone may comprise heat exchangers of the regenerative or passage exchanging types. In order to avoid a build-up of carbon dioxide solid particles in such heat exchange zone, the zone must be "self-cleaning." This means that all of the impurities deposited in the zone during an air intake stroke must be evaporated and swept out during the next succeeding purge gas stroke. The self-cleaning condition may not be achieved by simply passing all of the outgoing product gas through the reversible heat exchange zone because compressed air, especially at low temperatures, has a substantially greater specific heat than the non-compressed air separation products e.g. oxygen and nitrogen. This causes excessive temperature differences at the cold end of the heat exchange zone which are extremely unfavorable for removal of deposits.

The prior art methods of alleviating this condition may be divided into two major classes. The reversible heat exchange zone may be made self-cleaning by reducing the cold end temperature differences through the expedient of unbalancing the flow rate. This is achieved by either increasing the cold fluid flow relative to the countercurrent incoming air flow in the colder section of the heat exchangers, or reducing the quantity of incoming air passing through the colder section.

In one prior art system which is illustrative of the first approach to self-cleaning, a portion of the air emerging from the heat exchanger cold end is diverted back through the latter in a separate passageway countercurrent to the inlet air, and returned to the main air stream at the cold end of the heat exchange zone. This scheme has the disadvantage of forming an artificial "back pressure" on the inlet air stream because of pressure drop through the extra piping and slight warming of the main air stream by virtue of mixing with the partially warmed diverted air. Alternatively, a cold air separation product (nitrogen or oxygen) may be diverted from the product stream before entering the cold end of the heat exchange zone, conducted through the separate passageway, and returned to the main product stream at the cold end. This scheme has the disadvantage of forming an artificial back pressure on the product stream. In either embodiment, the net result is the requirement of a higher air inlet pressure and increased power costs.

In one example of the second general approach to the self-cleaning problem, approximately 10% of the inlet air is diverted from the reversible heat exchange zone at the −100° C. level, which is just above the carbon dioxide deposition range. Unfortunately the diverted or "side-bleed" air retains its original quantity of carbon dioxide (approximately 300 p.p.m.) and other low-boiling impurities and such impurities must be removed by relatively expensive means such as adsorption or chemical reaction.

One object of the present invention is to provide a process and apparatus for purifying and separating compressed air in which the reversible heat exchange zone is maintained in the self-cleaning condition.

Additional objects of this invention are to provide a process and apparatus for air purification and separation in which the reversible heat exchange zone is maintained in the self-cleaning condition without entailing additional operating expenses, without requiring the use of additional moving mechanical components such as a blower, and without necessitating expensive supplementary clean-up equipment for the low-boiling impurities.

These and other objects and advantages of the invention will become apparent from the following description and accompanying drawings showing exemplary embodiments of apparatus for separating gas mixtures such as air, and including improvements according to the invention.

Figure 2:
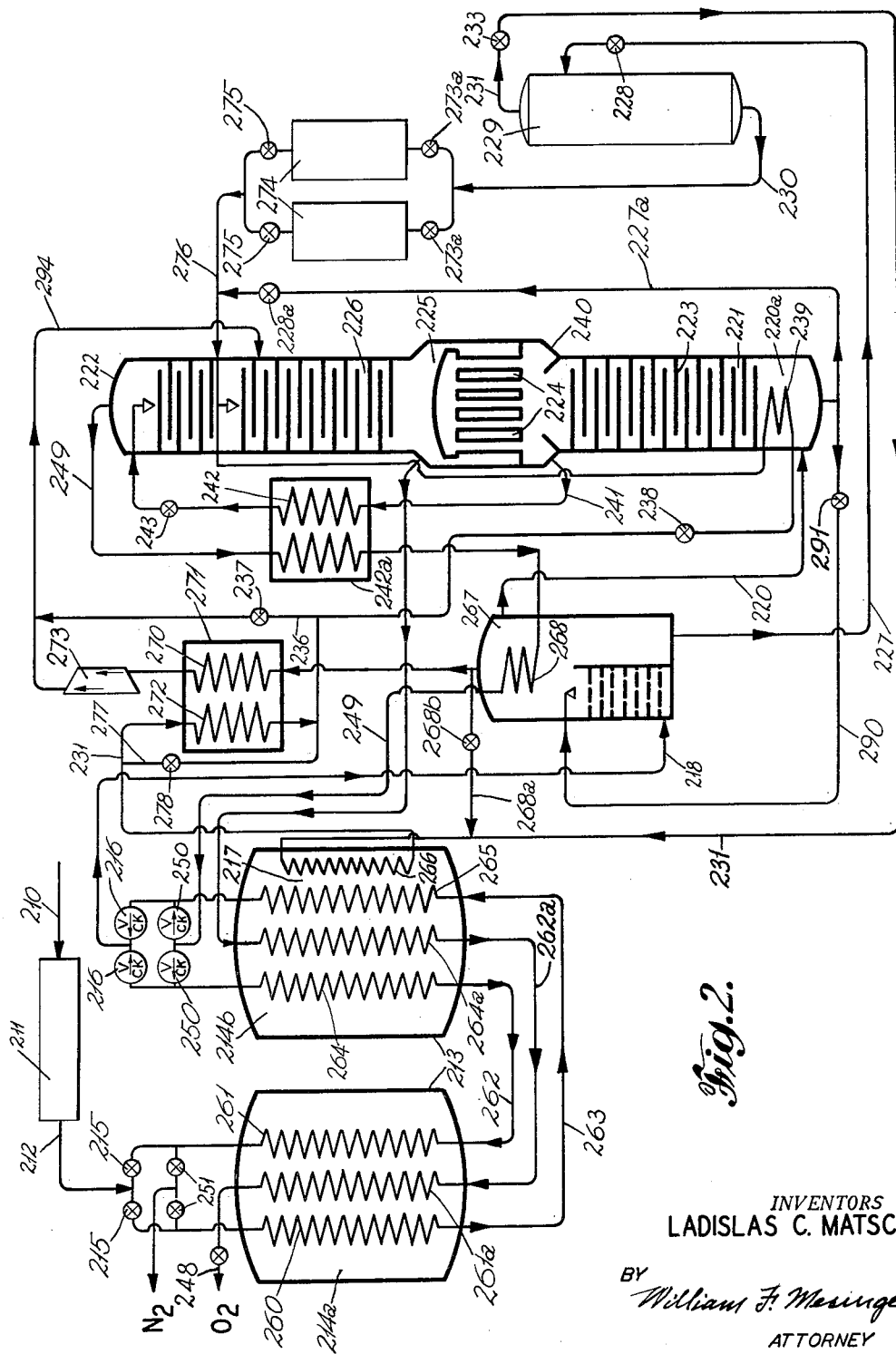
Figure 3:
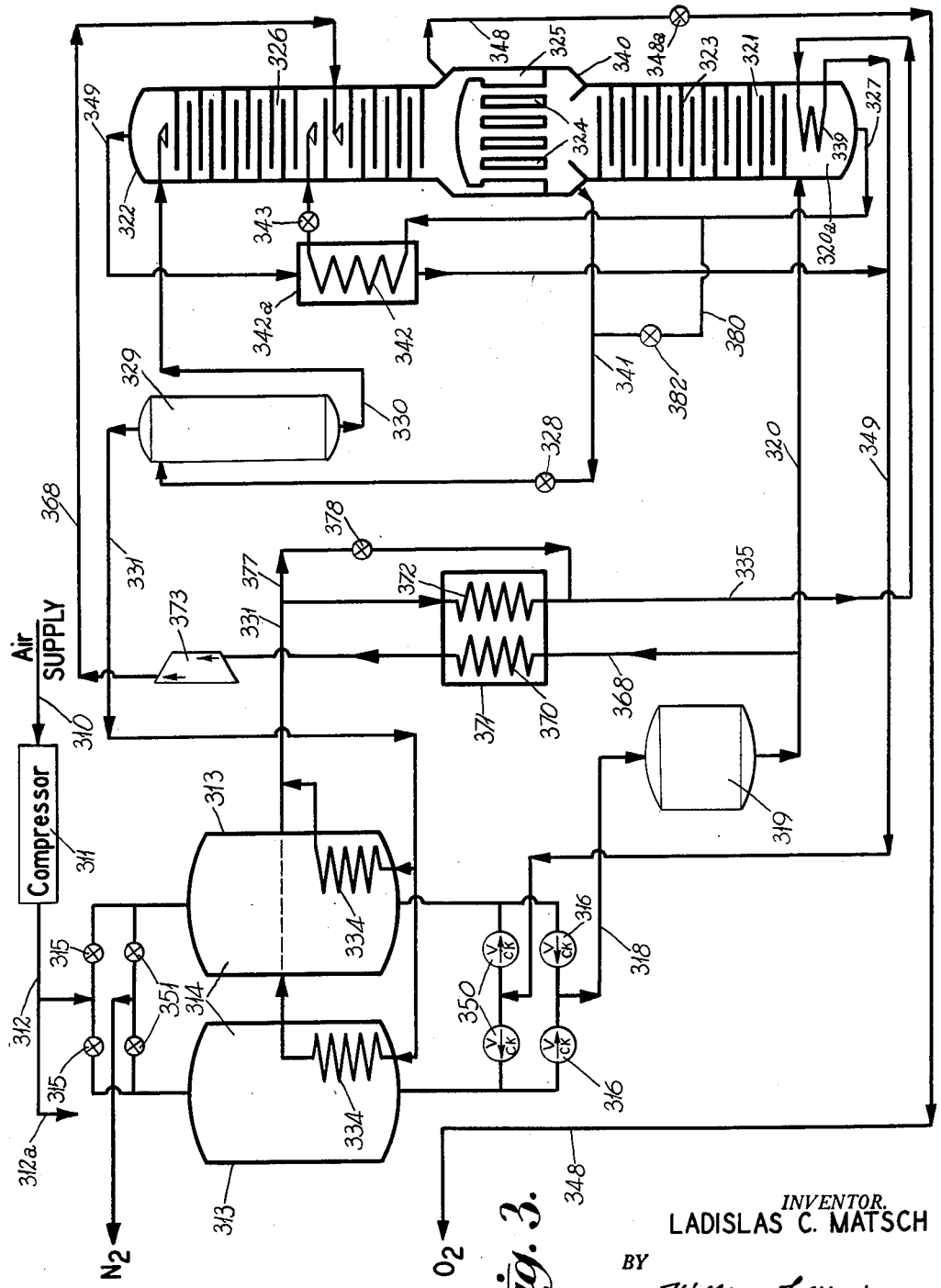

In the drawings:
FIGURE 1 is a schematic flow diagram of a gaseous oxygen producing cycle in which flashoff vapor from throttled oxygen-enriched liquid provides the necessary flow unbalance for the reversible heat exchange zone;
FIGURE 2 is a schematic flow diagram of another cycle similar to that of FIGURE 1, but modified so that flashoff vapor from throttled scrubber liquid provides the flow unbalance; and
FIGURE 3 is a schematic flow diagram of still another cycle similar to that of the other figures, but modified so that flashoff vapor from throttled nitrogen-rich liquid provides the flow unbalance.

In the drawings, similar items of apparatus in the several figures are designated by similar reference characters.

According to the present invention a compressed inlet gas mixture stream to be separated by low-temperature rectification is cooled to a temperature near its dewpoint by passage in one direction of flow along a first cooled path in a reversible heat exchange zone so that at least most of the low-boiling impurities of such gas mixture inlet stream are deposited in the colder section of the first path. A second gaseous stream obtained from the gas mixture inlet stream after the impurity deposition is subsequently passed at a low temperature through the first cooled path in the opposite direction of flow after the gas mixture inlet stream has ceased flow therethrough. The temperature of the colder section of the first path is controlled so as to achieve substantially complete re-evaporation and removal of the previously deposited impurities into the second gaseous stream by reducing the temperature difference between the gas mixture inlet stream and the second gaseous purge stream in the colder section of the first path by heat exchange with a third gaseous stream passing through a separate path in at least the colder section of the heat exchange zone. The third gaseous stream comprises at least in part, a flashoff vapor obtained by throttling a liquid which has been obtained by liquefaction treatment of the mixture stream subsequent to its passage through the reversible heat exchange zone and separating the resultant stream into liquid and vapor flashoff fractions, the latter being directed to the separate path.

In one embodiment of the invention, a portion of an inlet air stream is liquefied before passage to the rectification and serves as scrubbing liquid for the unliquefied inlet air, so that the low-boiling impurities remaining in the latter are transferred to the scrubbing liquid. The latter is then throttled to a lower pressure, and the resulting flashoff vapor is separated therefrom for use as the third gaseous stream which unbalances the heat exchange zone.

In another embodiment, the flashoff vapor is obtained by throttling an oxygen-enriched liquid of the inlet air which has been liquefied in and withdrawn from the rectification. Alternatively, a nitrogen-rich liquid from the rectification may be throttled to provide the flashoff vapor. In either case, the resulting throttled liquid is preferably returned to the rectification as reflux liquid.

Referring now to the drawings and particularly to FIGURE 1, air entering the system through conduit 10 is compressed in compressor 11 to a pressure below about 150 p.s.i., and preferably about 75 p.s.i., and the heat of compression may be removed by, for example, a water-cooled heat exchanger (not shown). The compressed air is discharged into conduit 12 for passage to the warm end of the reversible heat exchange zone 13 which, for example, may be a pair of regenerators 14 piped in parallel. The inlet air stream enters the regenerators through reversing valves 15 and emerges through check valves 16 at the cold ends. The regenerators 14 in general operate in the well-known Fränkl manner, and are cooled by outflowing nitrogen product purge gas from rectification column. Although only one pair of regenerators are illustrated, it is to be understood that in practice a second pair of regenerators are preferably used to cool a portion of the inlet compressed air in conduit 12a by means of the oxygen product gas from the rectification column.

The inlet air emerging from the cold end of the regenerators 14 has been cooled to near the dew point of the pure air stream, e.g. −170° C., and most of its lower-boiling impurities have been deposited in the colder section 17 of the regenerators. The partially cleaned cold air stream is discharged into conduit 18 and passed to adsorption trap 19 for removal of the remaining low-boiling impurities therein by gas phase adsorption by suitable material, such as silica gel. The cleaned, cold air stream is discharged therefrom into conduit 20, and passed to the base or kettle 20a of the higher pressure chamber 21 of the rectification column 22 for partial liquefaction and rectification therein. The higher pressure chamber 21 contains suitable liquid-gas contact devices, for example rectification trays 23, so that the rising gas is partially liquefied and rectified by the descending reflux liquid. The liquid reaching the kettle 20a of higher pressure chamber 21 is oxygen-enriched liquid air, whereas the gas rising into the top of this chamber is nitrogen-rich. This gas enters tubes 24 of main condenser 25, the latter separating the higher pressure chamber 21 from the lower pressure chamber 26. The nitrogen-rich gas in tubes 24 is condensed by heat exchange with the lower pressure boiling liquid oxygen on the shell or lower pressure chamber side of the main condenser 25.

The oxygen-enriched liquid accumulating in the kettle 20a is withdrawn through conduit 27, throttled through valve 28 therein to about 10 p.s.i.g., which is slightly above the operating pressure of the lower pressure chamber 26 of the rectification column 22. The throttled liquid is passed into separator 29 for disengagement of the flashoff vapor from the remaining liquid, the latter being directed through bottom conduit 30 into the lower pressure rectification chamber 26 as reflux liquid therefor.

Liquid flow is preferably by gravity; alternatively a slight pressure differential between the separator 29 and the lower pressure chamber 26 may be provided. The flashoff vapor is vented from separator 29 through conduit 31 and if desired, a regulated portion may be diverted therefrom through conduit 32 and control valve 33 to an intermediate point of the lower pressure rectification chamber 26 for separation therein. The undiverted flashoff vapor in conduit 31 is directed to the cold end of regenerators 14 and conducted through coil passageways 34 embedded in the colder part of such regenerator. If required, additional unbalance fluid may be obtained by diverting a portion of the cold, clean air from conduit 20 through conduit 21a and regulating valve 21b therein to conduit 31, before passage to coils 34. A substantial portion of the refrigeration in the flashoff is thus transferred to the inlet air stream or the outgoing product purge stream passing through the regenerator bodies. The result of this refrigeration transfer is that the temperature difference between the inlet air and the outgoing purge gas is reduced in colder section of the regenerators, where the low-boiling impurities are deposited. In this manner the temperature of the product purge stream passing through the reversible path will be sufficiently close to the temperature of the inlet air stream having previously passed therethrough to substantially completely remove the impurities deposited therein.

The partially warmed flashoff vapor is preferably discharged from passageways 34 into conduit 35 at about −108° C., and passed through control valve 38 therein to coil 39 which is immersed in the oxygen-enriched liquid in the bottom or kettle 20a of the higher pressure rectification chamber 21. The flashoff vapor is recooled in coil 39 by heat exchange with the oxygen-enriched liquid and passed to the lower pressure rectification chamber 26 for separation therein. Alternatively, the partially warmed flashoff vapor in conduit 35 may be diverted through conduit 36 and control valve 37 to the lower pressure rectification chamber 26 for separation therein.

It is to be noted that the level of vapor introduction to the lower pressure rectification chamber 26 is dependent on the degree of superheat; thus, the recooled flashoff vapor stream is introduced at a higher level than the non-recooled flashoff vapor stream. If the gas is saturated it can be introduced at a relatively high level, but if it is substantially superheated the gas is preferably introduced at a lower point to maximize rectification efficiency. Although simultaneous passage of the flashoff vapor through both nitrogen regenerator pair 14 has been described, it should be understood that all of the flashoff vapor used for unbalance purposes could be passed as a single stream alternately through one regenerator and then through the other, either in phase with the switching cycle of the nitrogen purge gas and inlet air, or out of phase therewith. For example, the flashoff vapor stream may be passed through each regenerator during the last half of the air-in-flow and during the first half of the nitrogen-outflow half cycle. For these purposes control valves and opening-closing mechanisms (not illustrated) would be provided to effect the desired flows. Also, passageways similar to those in the nitrogen regenerator pair 34 may be provided in the oxygen regenerator pair (not illustrated) if desired.

From the foregoing description, it will be evident that the present invention provides substantial advantages over the heretofore proposed unbalancing systems. For example, since the unbalance fluid is kettle flashoff vapor generated by throttling the kettle liquid which is normally transferred directly to the lower pressure rectification chamber, there is no additional operating expense and the lower pressure chamber is still provided with the required quantities of kettle liquid and vapor. Also, since the driving force for the recirculation of the kettle flashoff vapor is part of the inherent pressure differential between the higher and lower pressure rectification chambers, a moving mechanical component such as a pump or blower is not required. Furthermore, all of the inlet air is processed from the warm to the cold end of the reversible heat exchange zone, and most of the low-boiling impurities are deposited therein. If necessary, the remaining impurities are removed in a relatively small adsorption trap placed at the cold end of the heat exchange zone. Also, the flashoff vapor stream used for unbalancing this zone is clean, so that there is no problem of impurity deposition in the unbalance fluid circuit.

The lower pressure chamber 26 of the rectification column 22 operates in the well-known manner, and is provided with suitable liquid-gas contact means such as trays 23. Nitrogen-rich liquid accumulating on the shelf 40 of higher pressure chamber 21 is withdrawn into conduit 41 and directed to passageway 42 in heat exchanger 42a. The liquid is subcooled therein by heat exchange with nitrogen product gas from the lower pressure chamber 26, throttled through valve 43, and introduced into the top of the chamber as reflux liquid. The rectification system of FIGURE 1 does not have a specific refrigeration producing device, and the low temperature refrigeration needed for operation is obtained from a body of low temperature liquid which is stored in thermally insulated tank 43a, the latter being filled through conduit 44 with control valve 45 therein. Liquid oxygen is fed from tank 43a to main condenser 25 through conduit 46 having control valve 47 therein. Product oxygen gas is withdrawn from the base of the lower pressure rectification column 26 through conduit 48 and control valve 48a therein, and passed to a second regenerator pair (not illustrated) for cooling and cleaning a portion of the inlet air stream. The gaseous nitrogen product of the rectification is withdrawn from the lower pressure chamber 26 through conduit 49 and passed to heat exchanger 42a where it is superheated and simultaneously subcools the nitrogen-rich reflux liquid in passageway 42, as previously described. The partially warmed nitrogen product gas is then directed to the cold end of either of the regenerator pair 14 through check valves 50, and simultaneously recools and purges the regenerators of the previously deposited low-boiling impurities, as previously described. The warmed and impurity laden nitrogen product purge gas is discharged from the warm end of the regenerators through reversing valves 51 into conduit 52 for discharge to the atmosphere, or further processing as desired.

In FIGURE 1, the flashoff vapor was obtained by throttling a portion of the inlet air stream which had been liquefied in the rectification zone. The flashoff vapor may also be obtained by throttling a portion of the inlet air which has been liquefied before passage to the rectification zone, and which serves as at least part of the scrubbing liquid for the unliquefied inlet air, so that the low-boiling impurities remaining in the latter are transferred to the liquid. FIGURE 2 illustrates another air separation cycle according to the present invention, which differs in certain particulars from FIGURE 1. For example, a scrubber filter system is used instead of an absorption trap to remove the residual low-boiling impurities from the inlet air stream, and the flashoff vapor is obtained by throttling the impurity-containing scrubber liquid. Also, passage exchanging heat exchangers are used in the reversible heat exchange zone instead of recuperative type vessels. The heat exchangers in general operate in a manner well-known to those skilled in the art.

The compressed air inlet stream enters the warm leg reversing heat exchange 214a through one of the reversing passageways 260 and 261, and is cooled by nitrogen purge gas flowing countercurrently in the other reversing passageway 260 or 261, and oxygen product gas in non-reversing passageway 261a. The partially cooled air inlet stream at about −100° C. is discharged from warm leg 214a into conduit 262 or 263, and directed to cold leg reversing heat exchanger 214b for further cooling in reversing passageway 264 or 265 by the nitrogen purge gas in the other reversing passageway, and oxygen product gas in non-reversing passageway 264a. The inlet air in the cold leg 214b is additionally cooled by flashoff vapor in passageway 266 flowing countercurrent to the inlet air.

The cold, partially cleaned inlet air stream is discharged from cold leg 214b into conduit 218 and passed to the base of scrubber 267 where its remaining low-boiling impurities are transferred to the liquid by bubbling through such liquid or through any suitable gas and liquid contact means to obtain the desired scrubbing action. Scrubbing liquid is supplied by passage of oxygen-enriched liquid from kettle 220a through conduit 290 and control valve 291 therein to scrubber 267. This liquid is preferably transferred by gravity flow, although a pump (not illustrated) may be placed in conduit 290 if desired. Additional scrubber liquid is supplied by liquefying part of the scrubbed vapor by heat exchange with the colder product nitrogen gas passing through the scrubber in coil 268 and discharging into conduit 249. Alternatively, the scrubber may be built into the lower end of the higher pressure rectification chamber 221. One part of the unliquefied scrubbed air is passed from scrubber 267 into conduit 268 and directed to passageway 270 of a countercurrent heat exchanger 271 where it is preheated from about −170° C. to approximately −155° C. by the partially warmed flashoff vapor in thermally associated passageway 272. The preheated clean air is then directed to turbine 273 for expansion with the production of external work from about 70 p.s.i.g. to about 5 p.s.i.g. It is to be noted that the scrubbed air was preheated prior to expansion to avoid condensation within the turbine 273 which could cause erosion of the turbine blades. The work expanded air in conduit 294 is passed to the lower pressure rectification chamber 226 for separation therein.

Returning to the scrubber 267, the remaining unliquefied scrubbed air is passed through conduit 220 to the base of the higher pressure chamber 221 for partial separation and liquefaction therein. The impurity-containing scrubber liquid is withdrawn through conduit 227, throttled to a lower pressure through valve 228, and passed into separator 229 for phase separation therein. The throttled impurity-containing separator liquid is discharged through conduit 230 and passed through filter inlet valves 273a into one or the other of a pair of the filters 274 for removal of the solid low-boiling impurities. These filters are provided in duplicate and piped in parallel for alternate operation so that when one filter becomes loaded with impurities, the liquid may be diverted to the other filter having previously been purged by means not illustrated. Alternatively, filters 274 may be located in conduit 227, between scrubber 267 and separator 229. The cleaned scrubber liquid emerges through filter discharge valves 274 into conduit 276, and enters the lower pressure chamber 226 at an intermediate point thereof along with the throttled oxygen-enriched liquid from conduit 227a as reflux liquid. The clean flashoff vapor is discharged from separator 229 through conduit 231 with regulating valve 233 therein, and directed to the cold end of cold leg reversing heat exchanger 214b for passage through non-reversing passageway 266 to unbalance the reversible heat exchange zone 213, close the temperature difference in the colder section 217, and achieve the desired self-cleaning condition. If desirable, additional unbalance may be obtained by diverting a portion of the scrubbed air from conduit 268 through conduit 268a and control valve 268b therein to conduit 231, upstream of colder section 217. The partially warmed flashoff vapor stream is discharged from passageway 266 into conduit 231 and directed to passageway 272 of heat exchanger 271, when it preheats part of the scrubbed vapor in passageway 270 and is simultaneously recooled. Conduit 277 and regulating valve 278 therein are provided to bypass a portion of the partially warmed flashoff vapor around heat exchanger 271 if desired. The recooled flashoff vapor stream emerging in conduit 231 may be diverted through conduit 236 with control valve 237 therein to a juncture with the turbo-expanded air in conduit 268 passing to the lower presure chamber 226 for separation therein. Preferably, the recooled flashoff vapor in conduit 231 is directed to coil 239 in the kettle 220a of the higher pressure chamber 221 where it is further recooled by heat exchange with the oxygen-enriched liquid. The further recooled flashoff vapor is finally passed into the lower pressure chamber 26 at an intermediate point thereof.

Instead of providing the required flashoff vapor stream from the oxygen-enriched liquid as illustrated in FIGURE 1, the flashoff vapor may alternatively be provided by throttling the other reflux liquid produced in the higher pressure rectification chamber; namely, the nitrogen-rich liquid. The selection of the flashoff system will depend upon specific requirements of the cycle in which it is used. The stream which supplies the flashoff vapor is not subcooled; consequently, less liquid will be available from this stream for lower pressure chamber reflux. In general, it is desirable to subcool any reflux liquid, because this expedient minimizes evaporation on subsequent throttling and thus maximizes the quantity of the liquid for refluxing purposes. In some cycles, it may be preferable to subcool the oxygen-enriched liquid, taking advantage of the larger temperature difference available between this stream and the nitrogen product. In other cycles where the reflux ratio at the top of the lower pressure rectification chamber is critical or deficient, it may be preferable to subcool the nitrogen-rich liquid to obtain maximum reflux at the top of such chamber.

FIGURE 3 differs from the other figures in certain particulars; for example, the flashoff vapor is obtained by throttling the nitrogen-rich liquid. Another distinctive feature of this figure is that the oxygen-enriched liquid is sub-cooled prior to passage into the lower pressure rectification chamber as reflux liquid. Referring now specifically to FIGURE 3, the oxygen-enriched liquid accumulating in the kettle 320a of high pressure rectification chamber 321 is withdrawn through conduit 327 and directed to passageway 342 of heat exchanger 342a, where it is subcooled by nitrogen product gas entering the exchanger through conduit 349. Nitrogen-rich liquid is withdrawn from the shelf 340 into conduit 341, throttled through valve 328 to a pressure slightly above that of the lower pressure chamber 326 and passed to separator 329. The throttled nitrogen-rich liquid is withdrawn from the bottom of separator 329 through conduit 330 and passed into the top of lower pressure rectification chamber 326 as reflux liquid. The separator flashoff vapor is vented through conduit 331 to unbalance passageways 334 in reversible heat exchange zone 313, where it aids in closing the cold end temperature difference, as previously described, while being simultaneously partially rewarmed. The flashoff vapor is then consecutively recooled in heat exchanger 371, kettle 320a of higher pressure rectification chamber 321, and joined with the nitrogen rectification product in conduit 349 for passage to the cold end of the reversible heat exchange zone 313 as purge and cooling gas therefor.

It is contemplated that in most air separation systems embodying the present invention, the quantity of flashoff vapor available from either the oxygen-enriched liquid or the nitrogen-rich liquid will be sufficient to provide the required flow unbalance for the reversible heat exchange zone. However, in special cases where the vapor from one of these systems is insufficient for flow unbalance requirements, a combination of the two systems would be feasible. In this event, it would be preferable to utilize all of the flashoff vapor available from one of the liquids, and additionally provide only enough flashoff vapor from the other liquid to make up the deficiency. The two vapor streams may be mixed before entering the unbalance passageway of the reversible heat exchange zone to avoid duplication of separate passes. In the event that the vapor obtained from flashoff is insufficient to cause the necessary flow unbalance, as for example, from the nitrogen-rich liquid as shown in FIG. 3, a portion of the kettle liquid flowing in conduit 327 may be withdrawn through conduit 380 and combined with the nitrogen-rich shelf liquid flowing in conduit 341. The amount of kettle liquid used in this manner is controlled by valve 382 in conduit 380. Depending on the composition of the combined stream, it may be introduced at the proper level in the lower pressure rectification chamber for separation or joined with the nitrogen separation product at the cold end of the reversible heat exchange for use as purge gas. Although the flashoff vapor unbalance passageways have been described and illustrated as being contained only in the colder part of the heat exchange zones of the various embodiments, it is to be understood that such passageways could extend to the warm end of such zones. In this event, the flows would be adjusted accordingly, and the flashoff vapor would be recooled before further use in the process.

It can be seen from the foregoing description that the present invention provides a system for purifying and separating compressed air, in which the reversible heat exchange zone is maintained in the self-cleaning condition without entailing additional operating expense and without requiring additional moving mechanical components or supplementary cleanup equipment for the low-boiling impurities.

Although preferred embodiments of the invention have been described in detail, it is contemplated that modifications of the process and apparatus may be made and that some features may be employed without others, all within the spirit and scope of the invention. The principles of the invention may also be applied to the separation of low-boiling gas mixtures other than air.

What is claimed is:

1. In a process for separating an impurity-containing gas mixture into its components by low-temperature rectification, wherein a compressed inlet gas mixture stream at a pressure below about 150 p.s.i.g. is cooled to a temperature near the dew-point of the pure gase mixture by passage in one direction of flow along a first cold path in a reversible heat exchange zone so that at least most of the low-boiling impurities of such inlet gas mixture stream are deposited in the colder section of the first path, and wherein a second gaseous stream obtained from said inlet gas mixture stream after such impurity deposition is subsequently passed at a low temperature through said first cooled path in the opposite direction of flow after said inlet gas mixture stream has ceased flow therethrough; the improvement comprising the step of controlling the temperature of said colder section of said first path so as to achieve substantially complete removal of the previously deposited gas mixture impurities by said second gaseous stream, by reducing the temperature difference between the inlet gas mixture stream and the second gaseous purge stream in said colder section of the first path by heat exchange with a third gas stream passing through a separate path in at least the colder section of said reversible heat exchange zone, said third gaseous stream comprising at least in part of a flashoff vapor obtained by throttling to a lower pressure a liquid stream derived from said inlet gas mixture stream after passage through said reversible heat exchange zone, separating the resultant stream into liquid and vapor fractions, and directing at least part of the vapor fraction to said separate path as said flashoff vapor; passing the unvaporized, throttled portion of said liquid stream derived from said inlet gas to said rectification as reflux liquid therefor.

2. In a process for separating impurity-containing air into its components by low-temperature rectification, wherein a compressed inlet air stream at a pressure below about 150 p.s.i.g. is cooled to a temperature near the dewpoint of the pure air stream by passage in one direction of flow along a first cooled path in a reversible heat exchange zone so that at least most of the low-boiling impurities of such inlet air stream are deposited in the colder section of the first path, and wherein a second gaseous stream obtained from said inlet air stream after such impurity deposition is subsequently passed at a low temperature through said first cooled path in the opposite direction of flow after said inlet air stream has ceased flow therethrough; the improvement comprising the step of controlling the temperature of said colder section of said first path so as to achieve substantially complete removal of the previously deposited air impurities by said second gaseous stream, by reducing the temperature difference between the inlet air stream and the second gaseous purge stream in said colder section of the first path by heat exchange with a third gaseous stream passing through a separate path in at least the colder section of said reversible heat exchange zone, said third gaseous stream comprising at least in part of a flashoff vapor obtained by throttling to a lower pressure a liquid stream derived from said inlet air stream after passage through said reversible heat exchange zone, separating the resultant stream into liquid and vapor fractions, and directing at least part of the vapor fraction to said separate path as said flashoff vapor; passing the unvaporized, throttled portion of said liquid stream derived from said inlet gas to said rectification as reflux liquid therefor.

3. A process according to claim 2 for the separation of impurity-containing air by low-temperature rectification, in which said flashoff vapor is obtained by throttling an oxygen-enriched liquid from the rectification.

4. A process according to claim 2 for the separation of impurity-containing air by low-temperature rectification, in which said flashoff vapor is obtained by throttling a nitrogen-rich liquid from the rectification.

5. A process according to claim 2 for the separation of impurity-containing air by low-temperature rectification, in which said flashoff vapor is obtained by throttling an oxygen-enriched liquid and a nirogen-rich liquid from the rectification.

6. A process according to claim 2 for the separation of impurity-containing air by low-temperature rectification, in which said flashoff vapor is obtained by throttling a portion of said air stream which has been liquefied before passage to the rectification.

7. A process according to claim 2 for the separation of impurity-containing air by low-temperature rectification, in which said third gaseous stream having passed through said separate path in said colder section of the reversible heat exchange zone is directed to the rectification for separation therein.

8. A process according to claim 2 for the separation of impurity-containing air by low-temperature rectification, in which at least part of said third gaseous stream having passed through said separate path in said colder section of the reversible heat exchange zone is partially recooled and directed to the rectification for separation therein.

9. A process according to claim 8 for the separation of impurity-containing air by low-temperature rectification, in which said part of said third gaseous stream is recooled by heat exchange with a colder fluid in the rectification before passage to the rectification for separation therein.

10. A process according to claim 2 for the separation of impurity-containing air by low-temperature rectification, in which the remaining low-boiling impurities in the cold, partially cleaned inlet air stream from said reversible heat exchange zone are substantially completely removed, and a portion of the resulting cold, clean inlet air stream is diverted, pre-heated by heat exchange with at least part of said third gaseous stream having passed through said separate path of said reversible heat exchange zone, expanded with the production of external work, and passed to the rectification for separation therein.

11. A process according to claim 10 for the separation of impurity-containing air by low-temperature rectification, in which the recooled third gaseous stream from the preheating step is passed to said rectification for separation therein.

12. A process for separating impurity-containing air into its components by low-temperature rectification in staged pressure rectification zones including the steps of providing a compressed inlet air stream at a pressure below about 150 p.s.i.g. and cooling such stream to a temperature near the dewpoint of the pure air stream by passage in one direction of flow along a first cooled path in a reversible heat exchange zone so that at least most of the low-boiling impurities of such stream are deposited in the colder section of the first path; subsequently passing an air separation product purge stream at a low temperature through the first path in the opposite direction of flow after said inlet air stream has ceased flow therethrough; substantially completely removing the remaining low-boiling impurities in the cold, partially cleaned inlet air stream discharged from said reversible heat exchange zone; rectifying at least part of the resulting cold, clean inlet air stream in the rectification so as to provide air separation products; passing at least part of one of said air separation products to said first path as the product purge stream; withdrawing an oxygen-enriched liquid from a higher pressure rectification zone; throttling such liquid to a lower pressure and separating the resultant mixture into a flashoff vapor and a remaining lower pressure oxygen-enriched liquid; passing such lower pressure liquid to a lower pressure rectification zone as reflux liquid therefor; and controlling the temperature of said colder section of said first path of the reversible heat exchange zone so as to achieve substantially complete reevaporation and removal of the deposited air impurities by the product purge stream by passing at least part of said flashoff vapor through a separate path in at least said colder section so as to reduce the temperature difference between the inlet air stream and said product purge stream in said colder section of the first path.

13. A process for separating impurity-containing air into its components by low-temperature rectification in staged pressure rectification zones including the steps of providing a compressed inlet air stream at a pressure below about 150 p.s.i.g. and cooling such stream to a temperature near the dewpoint of the pure air stream by passage in one direction of flow along a first cooled path in a reversible heat exchange zone so that at least most of the low-boiling impurities of such stream are deposited in the colder section of the first path; subsequently passing an air separation product purge stream at a low temperature through the first path in the opposite direction of flow after said inlet air stream has ceased flow therethrough; substantially completely removing the remaining low-boiling impurities in the cold, partially cleaned inlet air stream discharged from said reversible heat exchange zone, rectifying at least part of the resulting cold clean inlet air stream in the rectification so as to provide air separation products; passing at least part of one of said air separation products to said first path as the product purge stream; withdrawing a nitrogen-rich liquid from a higher pressure rectification zone; throttling such liquid to a lower pressure and separating the resultant mixture into a flashoff vapor and a remaining lower pressure nitrogen-rich liquid; passing such lower pressure liquid to a lower pressure rectification zone as reflux liquid therefor; and controlling the temperature of said colder section of said first path of the reversible heat exchange zone so as to achieve substantially complete reevaporation and removal of the deposited air impurities by the product purge stream by passing at least part of said flashoff vapor through a separate path in at least said colder section so as to reduce the temperature difference between the inlet air stream and said product purge stream in said colder section of the first path.

14. A process for separating impurity-containing air into its components by low-temperature rectification including the steps of providing a compressed inlet air stream and cooling such stream to a temperature near the dewpoint of the pure air stream by passage in one direction of flow along a first cooled path in a reversible heat exchange zone so that at least most of the low-boiling impurities of such stream are deposited in the colder section of the first path; subsequently passing an air separation product purge stream at a low temperature through the first path in the opposite direction of flow after said inlet air stream has ceased flow therethrough; partially liquefying the cold, partially cleaned inlet air stream discharged from said reversible heat exchange zone and scrubbing the remaining gas with liquid to transfer the remaining low boiling impurities thereto; throttling the resulting impurity-containing liquid to a lower pressure and separating the resultant mixture into a flashoff vapor and a remaining impurity-containing liquid; removing the impurities from such liquid and passing the impurity-free liquid to the rectification as reflux liquid therefor; passing at least part of the scrubbed impurity-free gas to the rectification for separation into products; passing at least part of one of the air separation products through said first path as the product purge stream; and controlling the temperature of said colder section of said first path of the reversible heat exchange zone so as to achieve substantially complete reevaporation and removal of the deposited air impurities by the product purge stream by passing at least part of said flashoff vapor through a separate path in at least said colder section so as to reduce the temperature difference between the inlet air stream and said product purge stream in said colder section of the first path.

15. Apparatus for the separation of impurity-containing air into its components by low-temperature rectification in a rectifying means including means by which an impurity-containing inlet air stream is supplied at a pressure below about 150 p.s.i.g.; a reversible heat exchange zone for cooling the inlet air to a temperature near the dewpoint of the pure air stream; a first cooled path through the heat exchange zone for passage of said inlet air in one direction so that at least most of the low-boiling impurities of such inlet air are deposited in the colder section of the first path; means for providing a second gaseous stream obtained from the inlet air stream after such cooling, and means for passing such second stream at a low temperature through said first cooled path in the opposite direction of flow after the inlet air stream has ceased flow therethrough; and means for controlling the temperature of said colder section of the first path so as to achieve substantially complete removal of the previously deposited air impurities by said second gaseous stream, comprising a separate path in at least the colder section of said reversible heat exchange zone, means for throttling a liquid stream obtained from the cooled inlet air stream, means for separating the resulting flashoff vapor from the throttled liquid, and means for passing the flashoff vapor to said separate path in said reversible heat exchange zone so as to reduce the temperature difference between the inlet air stream and the second purge stream in said colder section of the first path.

16. Apparatus for the separation of impurity-containing air into its components by low-temperature rectification in staged pressure rectifying means including means by which an impurity-containing inlet air stream is supplied at a pressure below about 150 p.s.i.g.; a reversible heat exchange zone for cooling the inlet air to a temperature near the dewpoint of the pure air stream; a first cooled path through the heat exchange zone for passage of said inlet air in one direction so that at least most of the low-boiling impurities of such inlet air are deposited in the colder section of the first path; means for passing an air separation product purge stream through said first cooled path at a low temperature in the opposite direction of flow after the inlet air stream has ceased flow therethrough; means for substantially completely removing the low-boiling impurities from the cold, partially cleaned inlet air stream discharged from said reversible heat exchange zone; means for passing at least part of the resulting cold, cleaned inlet air stream to the rectifying means to obtain air separation products; means for passing at least part of one of said air separation products to the cold end of the first path of said reversible heat exchange zone as said air separation product purge stream; and means for controlling the temperature of said colder section of the first path so as to achieve substantially complete removal of the previously deposited air impurities by said air separation product purge stream, comprising a separate path in at least the colder section of said reversible heat exchange zone, means for withdrawing an oxygen-enriched liquid from a higher pressure chamber of the rectifying means, means for throttling such liquid to a lower pressure, means for separating the resultant mixture into a flashoff vapor and a remaining lower pressure oxygen-enriched liquid, means for passing such lower pressure liquid to a lower pressure chamber of the rectifying means as reflux liquid therefor, means for passing at least part of said flashoff vapor to said separate path of the heat exchange zone so as to reduce the temperature difference between the inlet air stream and the product purge stream in said colder section of the first path.

17. Apparatus for the separation of impurity-containing air into its components by low-temperature rectification in staged pressure rectifying means including means by which an impurity-containing inlet air stream is supplied at a pressure below about 150 p.s.i.g.; a reversible heat exchange zone for cooling the inlet air to a temperature near the dewpoint of the pure air stream; a first cooled path through the heat exchange zone for passage of said inlet air in one direction so that at least most of the low-boiling impurities of such inlet air are deposited in the colder section of the first path; means for passing an air separation product purge stream through said first cooled path at a low temperature in the opposite direction of flow after the inlet air stream has ceased flow therethrough; means for substantially completely removing the low-boiling impurities from the cold, partially cleaned inlet air stream discharged from said reversible heat exchange zone; means for passing at least part of the resulting cold cleaned inlet air stream to the rectifying means to obtain air separation products; means for passing at least part of one of said air separation products to the cold end of the first path of said reversible heat exchange zone as said air separation product purge stream; and means for controlling the temperature of said colder section of the first path so as to achieve substantially complete removal of the previously deposited air impurities by said air separation product purge stream, comprising a separate path in at least the colder section of said reversible heat exchange zone, means for withdrawing a nitrogen-rich liquid from a higher pressure chamber of the rectifying means, means for throttling such liquid to a lower pressure and separating the resultant mixture into a flashoff vapor and a remaining lower pressure nitrogen-rich liquid, means for passing such lower pressure liquid to a lower pressure chamber of the rectifying means as reflux liquid therefor, means for passing at least part of said flashoff vapor to said separate path of the heat exchange zone so as to reduce the temperature difference between the inlet air stream and the product purge stream in said colder section of the first path.

18. Apparatus for the separation of impurity-containing air into its components by low-temperature rectification in a rectifying means including means by which an impurity-containing inlet air stream is supplied at a pressure below about 150 p.s.i.g.; a reversible heat exchange zone for cooling the inlet air to a temperature near the dewpoint of the pure air stream; a first cooled path through the heat exchange zone for passage of said inlet air in one direction so that at least most of the low-boiling impurities of such inlet air are deposited in the colder section of the first path; means for passing an air separation product purge stream through said first cooled path at a lower temperature than said colder section in the opposite direction of flow after the inlet air stream has ceased flow therethrough; means for partially liquefying the cold, partially cleaned inlet air stream discharged from said reversible heat exchange zone and means for scrubbing the remaining gas with liquid to transfer the remaining low-boiling impurities thereto, means for passing at least part of the resulting impurity-free gas to said rectifying means for rectification therein to provide air separation products; means for passing at least part of one of said air separation products to the cold end of the first path of said reversible heat exchange zone as said air separation product purge stream; and means for controlling the temperature of said colder section of the first path so as to achieve substantially complete removal of the previously deposited air impurities by said air separation product purge stream, comprising a separate path in at least the colder section of said reversible heat exchange zone, means for throttling the impurity-containing scrubber liquid to a lower pressure and separating the resultant mixture into a flashoff vapor and a remaining lower pressure impurity-containing liquid, means for removing the impurities from such liquid and passing the resulting impurity-free liquid to said rectifying means as reflux liquid therefor, means for passing at least part of said flashoff vapor to said separate path of the heat exchange zone so as to reduce the temperature difference between the inlet air stream and the product purge stream in said colder section of the first path.

References Cited in the file of this patent

UNITED STATES PATENTS

| | | |
|---|---|---|
| 2,664,719 | Rice et al. | Jan. 5, 1954 |
| 2,699,047 | Karwat et al. | Jan. 11, 1955 |
| 2,737,784 | Becker et al. | Mar. 13, 1956 |
| 2,836,040 | Schilling | May 27, 1958 |
| 2,840,994 | Lobo et al. | July 1, 1958 |
| 2,850,880 | Jakob | Sept. 9, 1958 |

FOREIGN PATENTS

| | | |
|---|---|---|
| 884,203 | Germany | July 23, 1953 |